(12) United States Patent
Brady et al.

(10) Patent No.: US 8,194,178 B2
(45) Date of Patent: *Jun. 5, 2012

(54) PROGRAMMABLE MICRO-ELECTROMECHANICAL MICROSHUTTER ARRAY

(75) Inventors: Frederick T. Brady, Webster, NY (US); Robert M. Guidash, Rochester, NY (US); J. Kelly Lee, Pittsford, NY (US); Marek W. Kowarz, Henrietta, NY (US); Robert Andosca, Macedon, NY (US)

(73) Assignee: OmniVision Technologies, Inc., Santa Clara, CA (US)

( * ) Notice: Subject to any disclaimer, the term of this patent is extended or adjusted under 35 U.S.C. 154(b) by 253 days.

This patent is subject to a terminal disclaimer.

(21) Appl. No.: 12/616,995

(22) Filed: Nov. 12, 2009

(65) Prior Publication Data

US 2010/0182496 A1 Jul. 22, 2010

Related U.S. Application Data

(60) Provisional application No. 61/139,031, filed on Dec. 19, 2008.

(51) Int. Cl.
*H04N 5/235* (2006.01)
*G02B 7/00* (2006.01)
*G02B 26/06* (2006.01)
*G02B 26/10* (2006.01)
*G02B 26/12* (2006.01)

(52) U.S. Cl. ....................................... 348/362
(58) Field of Classification Search .................. 348/362, 348/363, 367; 359/204.3, 223.1, 224.1, 224.2, 359/246–247, 290–292
See application file for complete search history.

(56) References Cited

U.S. PATENT DOCUMENTS

| | | | |
|---|---|---|---|
| 5,001,557 A | 3/1991 | Begle | |
| 5,078,479 A | 1/1992 | Vuilleumier | |
| 5,587,832 A | 12/1996 | Krause | |
| 5,784,190 A | 7/1998 | Worley | |
| 7,684,101 B2 | 3/2010 | Border et al. | |

FOREIGN PATENT DOCUMENTS

| | | |
|---|---|---|
| EP | 1026034 A2 | 8/2000 |
| GB | 516699 A | 1/1940 |
| WO | WO 2009/048526 A1 | 4/2009 |

OTHER PUBLICATIONS

Li et al., "Microshutter Array Development for the James Webb Space Telescope", *Proceedings of SPIE, Micro- and Nanotecnology: Materials, Processes, Packagihg, and Systems II*, vol. 5650, pp. 9-16.

(Continued)

*Primary Examiner* — Kelly L Jerabek
(74) *Attorney, Agent, or Firm* — Blakely Sokoloff Taylor & Zafman LLP

(57) ABSTRACT

A microshutter array has a frame having a light transmissive portion. Linear microshutter elements extend across the light transmissive portion and in parallel to each other. Each microshutter element has a flat blade extended in a length direction and first and second torsion arms extending outwards from each side of the blade in the length direction, the blade extending across the light transmissive portion. A control circuit provides a separately-controlled and independent voltage that is applied to each of the linear microshutter elements. A controller sets the respective voltages applied to each of the linear microshutter elements.

17 Claims, 6 Drawing Sheets

OTHER PUBLICATIONS

Motohara et al., "Development of Microshutter Arrays for Ground-Based Instruments" presented at The Workshop for Instrumentation on Extremely Large Telescopoes, Ringberg, Germany, Jul. 2005.
Takahashi, T. et al., "Electrostatically Addressable Gatefold Micro-Shutter Arrays for Astronomical Infrared Spectrograph," Asia-Pacific Conference of Transducers and Micro-Nano Technology—APCOT 2006, figures 1, 2, 5, 6b.

PCT/US2008/011420—International Search Report and Written Opinion of the International Searching Authority, mail date Jan. 23, 2009, 13 pages.
PCT/US2009/006614—International Search Report and Written Opinion of the International Searching Authority, mailed Apr. 9, 2010, 18 pages.
PCT/US2008/011420—International Preliminary Report on Patentability, issued Apr. 13, 2010 (7 pages).

PROGRAMMABLE MICRO-ELECTROMECHANICAL MICROSHUTTER ARRAY

CROSS-REFERENCE TO RELATED APPLICATIONS

This application claims the benefit of U.S. Provisional Application 61/139,031 filed on Dec. 19, 2008, which is incorporated herein by reference. This application is related to U.S. patent application Ser. No. 11/870,465 filed on Oct. 11, 2007.

TECHNICAL FIELD

This invention generally relates to shutter devices and more particularly relates to a micro-electromechanical array of individually programmable actuable light shutters for selectively blocking light over one or more rows of light-sensing pixels.

BACKGROUND

In digital camera and other imaging applications it is often useful to be able to selectively block light from falling on some portions of an electronic sensor and allow light to fall on other portions of the sensor. Conventional mechanical shuttering techniques have been used for an exposure sequence that sweeps across the sensor exposing only a portion at a time; however, this type of solution can be less desirable for miniaturized sensor arrays due to constraints of size, mechanical complexity, reliability, and cost.

MicroElectroMechanical Systems (MEMS) technology has been employed for providing shutter arrays with selectively actuable shutters in a number of display applications. For example, MEMS shutter arrays for display devices are described in U.S. Pat. No. 5,078,479 entitled "Light Modulation Device with Matrix Addressing" issued to Vuilleumier and U.S. Pat. No. 5,784,190 entitled "Electro-Micro-Mechanical Shutters on Transparent Substrates" issued to Worley. With display devices of this type, MEMS shutters correspond to image pixels, so that each display pixel is formed using one or more microshutter elements.

MEMS shutter arrays have also been adopted for use in light sensor applications. In one highly publicized NASA program, a MEMS microshutter array has been under development to support field selection for the near infrared spectrograph on the James Webb Space Telescope (JWST). This array uses a 128×64 element matrix of individually actuable 100 micron×200 micron shutter blades for variable field selection. Each shutter blocks light to a separate cell, with an electrode along one of the cell walls. Each shutter is normally closed until actuated. The shutter blades themselves are electromagnetically opened by sweeping a magnet over the array and then electrostatically latched over the desired target positions. This device is described in a paper entitled "Microshutter Array Development for the James Webb Space Telescope" by Li et al. in *Proceedings of SPIE, Micro- and Nanotechnology: Materials, Processes, Packaging, and Systems II*, volume 5650, pp. 9-16.

Recognizing inherent limitations of the solution used for the JWST device, astronomy researchers working with the Japan Aerospace Exploration Agency have proposed an alternate microshutter array that is electrostatically actuated. Their work is described in a paper entitled "Development of Microshutter Arrays for Ground-Based Instruments" by Motohara et al. presented at the Workshop for Instrumentation on Extremely Large Telescopes, Ringberg, Germany, July, 2005. The Motohara et al. device similarly uses an array of cells with a single shutter for each cell, normally closed until actuated and with its actuating electrode along a cell wall.

While MEMS microshutters have been developed for various display devices and for astronomical instrumentation, however, the solutions that have been proposed for either the JWST or Motohara et al. devices would be difficult to scale to the dimensions required for digital camera applications or for hand-held image capture devices in general. Moreover, even if such devices could be scaled to the dimensions needed for digital camera applications, problems such as poor fill factor, inherent fabrication difficulties, and disappointing shutter response times would significantly compromise their usefulness. These devices require considerable surface area for actuation and mechanical support components, severely reducing the proportion of the array that is available for transmission of light. This problem is particularly troublesome for small digital image capture apparatus, where it is desirable to provide as much light as possible from the object field.

Operational requirements further compound the problem. For example, the electromechanical initialization used in the JWST device, sweeping a magnet over the microshutter array in order to initially latch shutters in closed position, is impractical for implementation in a digital camera or other digital imaging apparatus. The high latching voltages required by the Motohara et al. device, in excess of 100 Vdc, render this type of solution wholly unsuitable for use within digital cameras. Both the JWST and Motohara et al. devices use electrodes that lie along a cell wall, which would not be an arrangement that could be readily fabricated at a smaller size using known MEMS techniques.

Thus, although MEMS microshutter arrays have been developed for some types of display and image-sensing applications, e.g., large separate cell arrays, there remains a need for a microshutter array solution that is suitable for use with digital cameras and other hand-held imaging devices.

SUMMARY

One aspect of the present invention is a microshutter array. The microshutter array includes a frame having a single opening that includes a light transmissive portion and a plurality of linear microshutter elements extending across the light transmissive portion and in parallel to each other. Each microshutter element includes a flat blade extended in a length direction across a width of the light transmissive portion and first and second torsion arms connected to the frame and extending outwards from each side of the blade in the length direction. A control circuit produces a separately-controlled and independent voltage that is applied to each of the linear microshutter elements. A controller sets the respective voltages applied to each of the linear microshutter elements.

Another aspect of the present invention is a system that includes the previously described microshutter array and a storage element for storing different settings for the linear microshutter elements.

Another aspect of the present invention is an imaging module that includes the previously described microshutter array and an image sensor.

ADVANTAGEOUS EFFECT

The present invention includes the advantage of applying independent and separately controlled voltages to each individual programmable actuable microshutter element in a microshutter array. This allows light to more effectively accommodate the angle of the rays from a lens, such as a camera lens. The speed of the microshutter array is improved while the power consumption of the microshutter array is reduced. The present invention also allows for greater flexibility in shutter timing.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings. The elements of the drawings are not necessarily to scale relative to each other.

DETAILED DESCRIPTION

Figure 1:
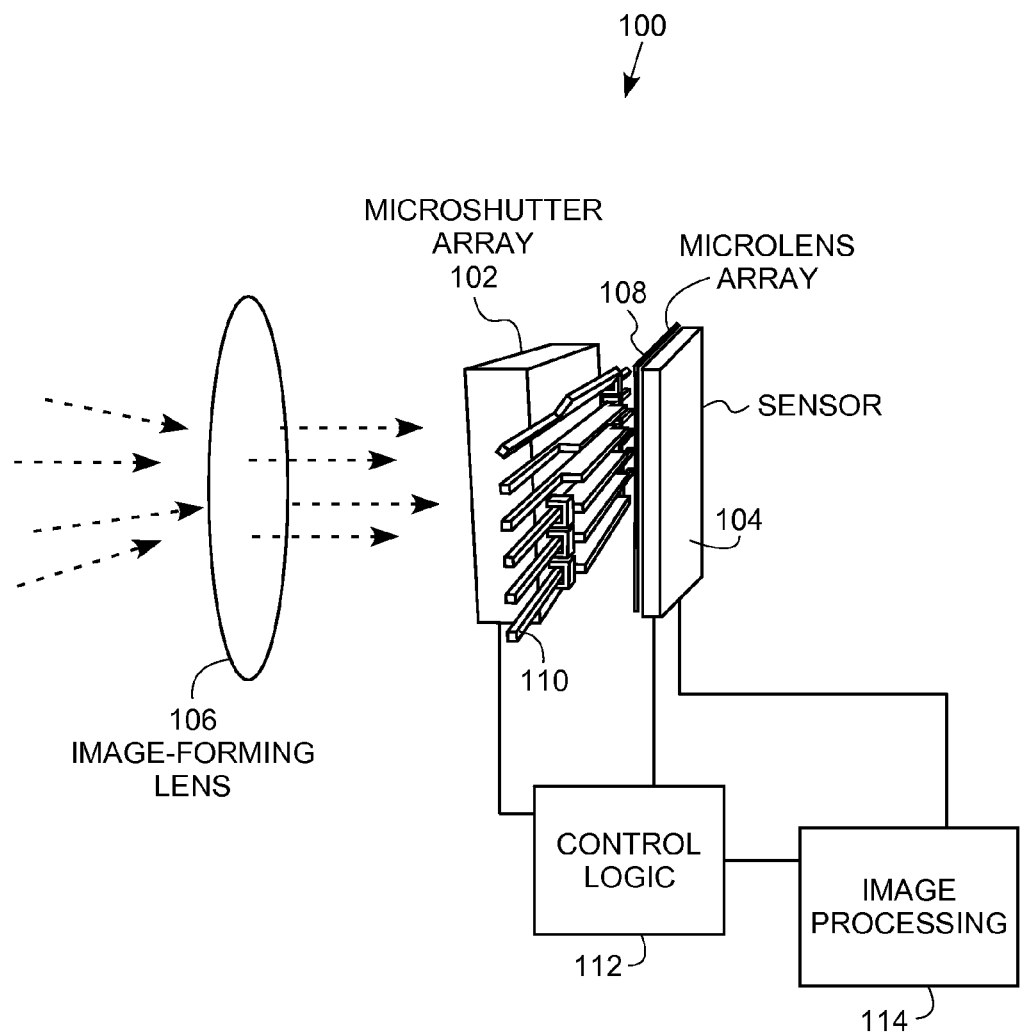
FIG. 1 is a schematic block diagram showing components of an imaging apparatus using a microshutter array in an embodiment in accordance with the invention.

The present description is directed in particular to elements forming part of, or cooperating more directly with, apparatus in accordance with the invention. It is to be understood that elements not specifically shown or described may take various forms well known to those skilled in the art. Referring now to the drawings in which like reference numbers represent corresponding parts throughout:

Figures shown and described herein are provided to illustrate principles of operation and fabrication according to the present invention and are not drawn with intent to show actual size or scale. Because of the relative dimensions of the component parts for the microshutter array of the present invention, some exaggeration is necessary in order to emphasize basic structure, shape, and principles of operation.

Referring now to FIG. 1, there is shown a schematic block diagram of the components of an imaging apparatus using a microshutter array in an embodiment in accordance with the invention. Imaging apparatus 100 includes microshutter array 102 and image sensor 104 in an embodiment in accordance with the invention. Image sensor 104, such as a Charge Coupled Device (CCD) or Complementary Metal Oxide Semiconductor (CMOS) image sensor, typically has an array of pixels arranged in rows and columns (not shown). Incident light from the object field, indicated by dotted-line arrows, is directed by image-forming lens 106 to sensor 104 through microshutter array 102 and, optionally, through microlens array 108. Microshutter array 102 has a number of individually programmable actuable shutter elements 110, also termed microshutter elements. Only a small number of microshutter elements 110 are shown in the diagram of FIG. 1, with deliberately exaggerated scale for MEMS embodiments in this and following drawings.

Actuation of microshutter elements 110 is controlled by control logic processor 112 (hereinafter "controller 112") that also controls image sensing functions in image sensor 104 in an embodiment in accordance with the invention. Image processing component 114 cooperates with controller 112 to obtain, process, and store the image data obtained from sensor 104. Controller 112 can be embedded in microshutter array 102, image sensor 104, image processing component 114, or with other control logic chips (not shown) such as, for example, an autofocus driver, in one or more embodiments in accordance with the invention.

Unlike conventional shutter configurations, microshutter array 102 uses microshutter elements 110 that span one or more lines or rows of pixels on image sensor 104. In the embodiment shown in FIG. 1, each microshutter element 110 extends fully across the width of the active area of sensor 104, providing a shutter for one or more complete rows of pixels. Having individually programmable actuable microshutter elements 110, this design is advantaged over conventional microshutter array configurations because of its improved speed and reduced power. Additionally, it allows for greater flexibility in shutter timing.

Figure 2:
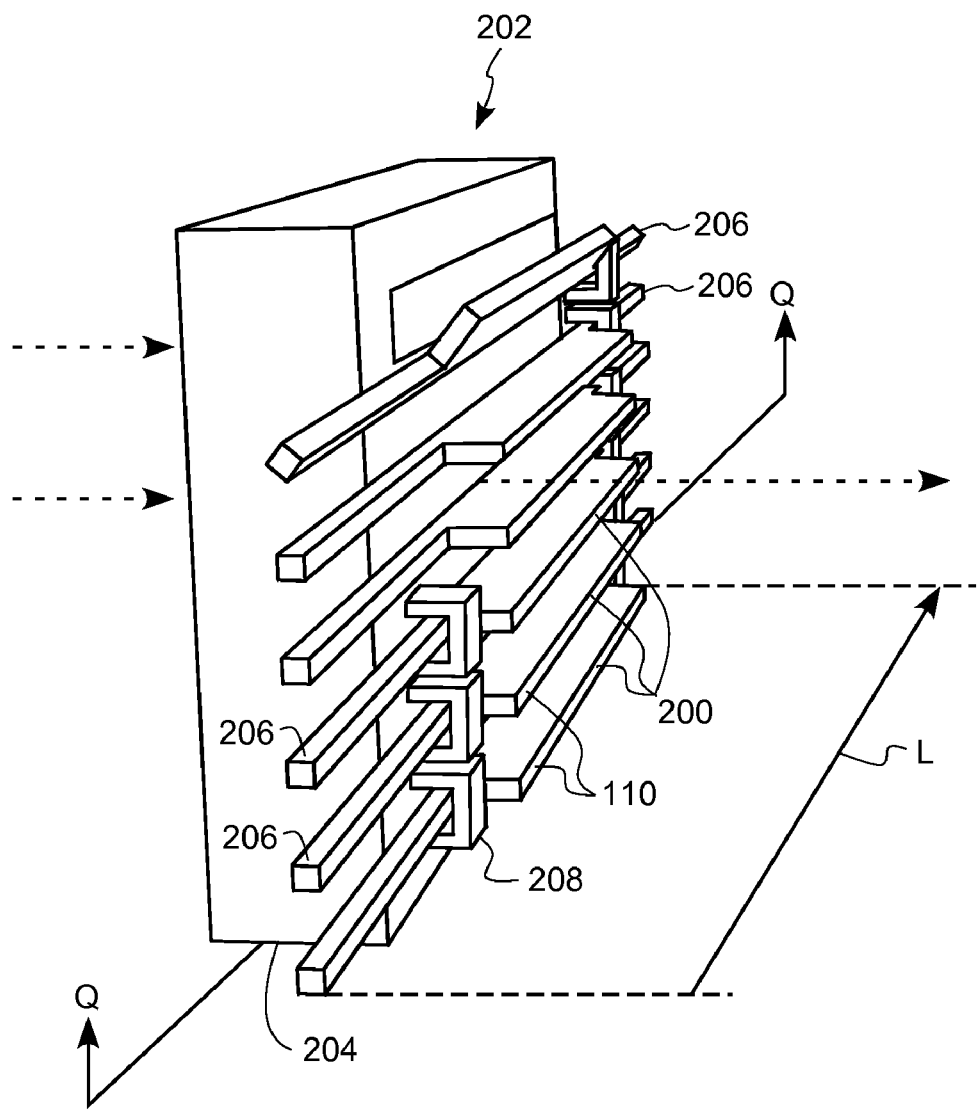
FIG. 2 is a perspective view of a section of microshutter array 102 in an embodiment in accordance with the invention.

The perspective view of FIG. 2 shows a section of microshutter array 102 in more detail, with components again exaggerated in size and with only a few microshutter elements 110 shown. Each microshutter element 110 has a flat blade 200 extended in a length direction across a light transmissive portion 202 of a frame 204 and first and second torsion arms 206 connected to frame 204 and extending outwards from each side of the blade 200 in the length direction L, the extended length of microshutter element 110. Each microshutter element 110 may seat within an optional journal bearing 208, a few of which are removed from FIG. 2 for better visibility of microshutter element 110. The purpose of journal bearing 208 is to help with microshutter alignment and to prevent collisions or other undesirable interactions between adjacent microshutter elements 110.

Blades 200 rotate from the standing up or vertical position in FIGS. 1 and 2 by applying a separately controlled and independent voltage to each blade. The voltages cause an electrostatic attraction to the frame 204 or substrate of microshutter array 102. This attraction torque on each blade 200 is nonlinear with voltage. A small voltage is preferably applied to blades 200 to partially rotate them from their resting position. However, to accommodate the angles of the rays from the lens, each blade 200 is angled by a slightly different amount from the outer edges of the array to the center in an embodiment in accordance with the invention.

Figure 3:
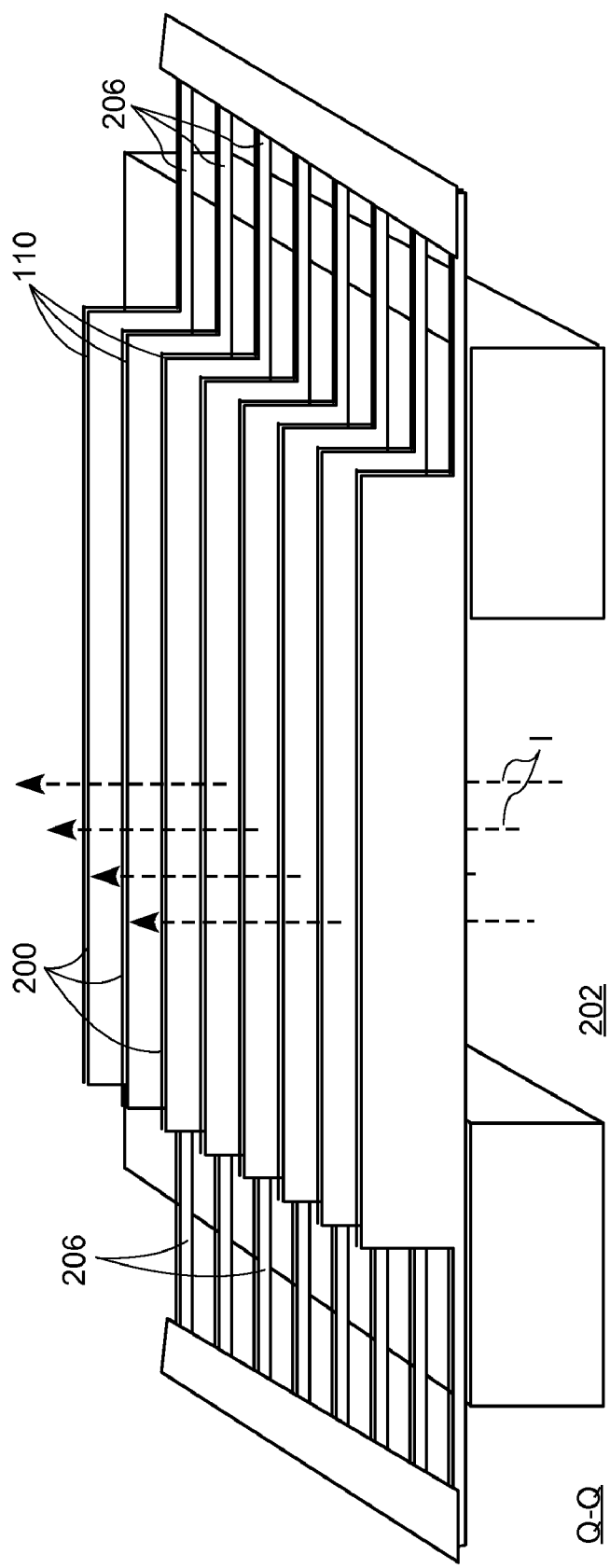
FIG. 3 is a view along line Q-Q in FIG. 2 showing a number of components of microshutter array 102 in an embodiment in accordance with the invention.

FIG. 3 is a view along line Q-Q in FIG. 2 showing a number of components of microshutter array 102 in an embodiment in accordance with the invention. FIG. 3 shows a section of microshutter array 102 in more detail, with components exaggerated in size and with only a few microshutter elements 110 shown. As discussed earlier, each microshutter element 110 has a flat blade 200 and two torsion arms 206 extending outwards from each side of blade 200 along length L, the extended length of microshutter element 110.

Incident light direction is shown by arrows labeled I. The frame supports the set of microshutter elements 110 and their corresponding journal bearings 208 (see FIG. 2), along with other support elements, and provides the light transmissive portion 202. Light transmissive portion 202 is transparent to incident light I in an embodiment in accordance with the invention. In another embodiment in accordance with the invention, light transmissive portion 202 is hollow.

The chief ray angle (CRA) for an image sensor can vary depending on the camera module design. Therefore, the optimal angles for the microshutter elements can vary. To be compatible with different CRA's the blade angles are programmable in an embodiment in accordance with the invention. One or more sets of settings for blades 200 can be stored in memory on microshutter array 102, image sensor 104, or the digital signal processing die. Valid settings can then be stored as register settings, which can then selected by the user, depending on the CRA.

Figure 4:
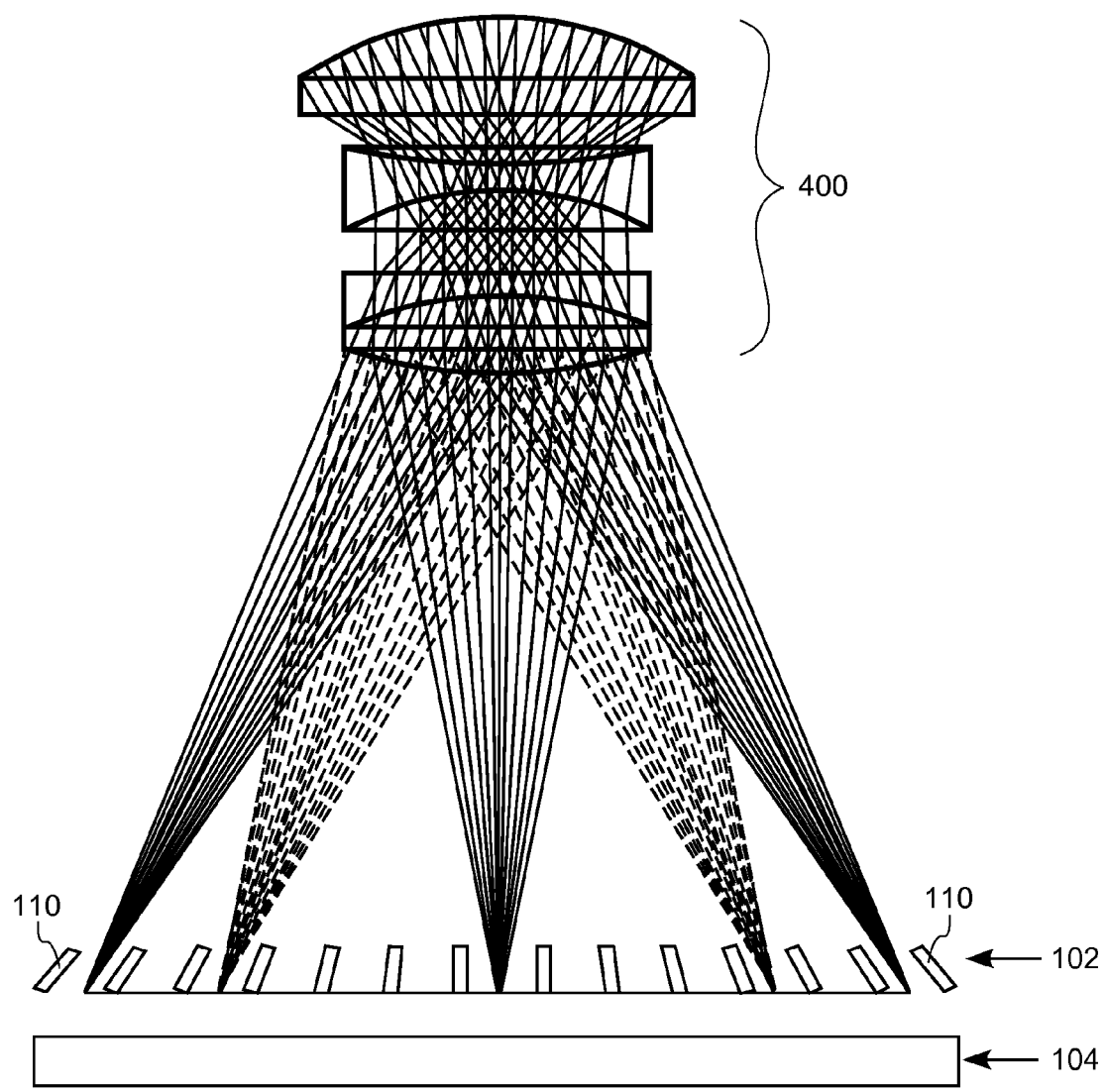
FIG. 4 is a side view of a camera lens and microshutter array 102 in an embodiment in accordance with the invention.

Generally, microshutter array 102 is placed between the top lens and image sensor 104. Microshutter elements 110 transmit more light in the open position than prior art systems because the blades 200 are suitably angled to accommodate the ray angles of the light from the objective lens of the camera. FIG. 4 is a side view of a camera lens and microshutter array 102 in an embodiment of the present invention. Note that in the z-direction (the direction in and out of the paper), the cone of light from the camera lens falls fully on image sensor 104. FIG. 4 illustrates the principle which allows light to more effectively accommodate the angle of the rays from camera lens 400. Note that in the exemplary embodiment shown in FIG. 4, blades 200 are tilted more on the far left and right than in the middle of image sensor 104 where blades 200 are not tilted much, if at all. The angle of each blade 200 gradually changes from the two ends to the middle. As discussed earlier, this is achieved in the FIG. 4 embodiment by applying a different voltage to each blade in the normally open position. Other embodiments in accordance with the invention can position blades 200 differently.

Figure 5:
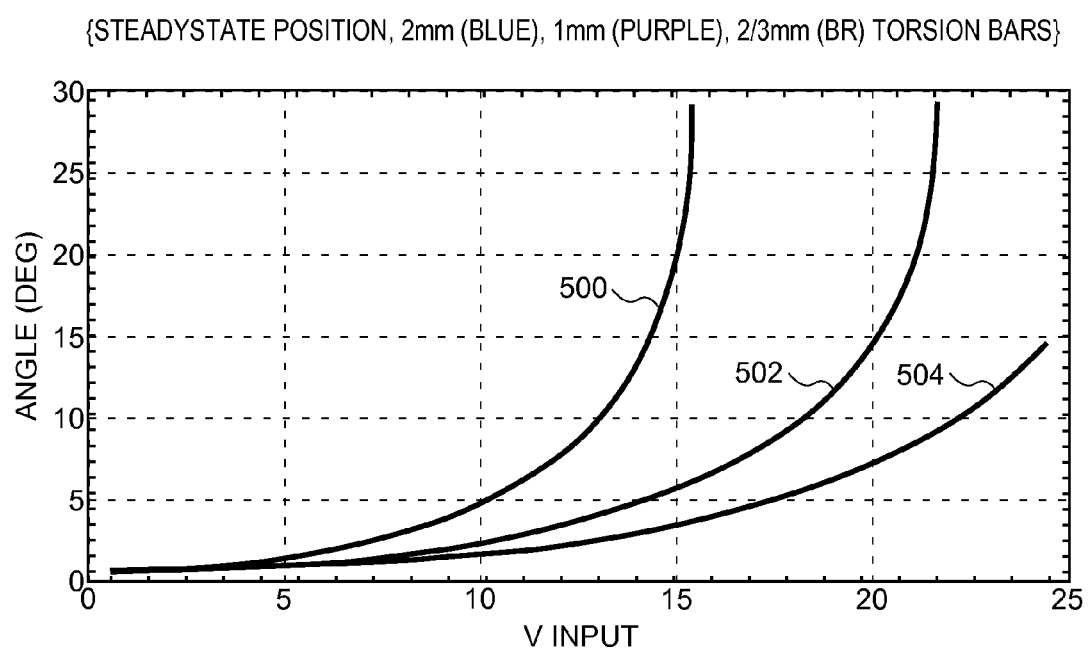
FIG. 5 depicts exemplary plots of blade angle versus applied voltage in an embodiment in accordance with the invention.

FIG. 5 is an exemplary plot of blade angle versus applied voltage in an embodiment in accordance with the invention. FIG. 5 depicts plots for three different torsion bar lengths. Plot 500 is for a torsion bar with a length of two millimeters, plot 502 for a bar having a one millimeter length, and plot 504 for a torsion bar with a length of two-thirds (⅔) millimeter. Note that with the longer two millimeter torsion bar, the strong nonlinearity is quite apparent. Beyond a certain point in voltage the blade angle changes very rapidly. By using the shorter, stiffer torsion bars, however, the nonlinearity is quite mild. Thus, moderate voltages can be used to control the shutter blade position over the range from 0 to 30 degrees, which is sufficient for most camera lens designs. Increasing the stiffness of the torsion bars also means that the voltage to fully close the shutter blades increases. Conventional metal oxide semiconductor (MOS) technology can accommodate voltages in the range of 20-75 volts. In one embodiment in accordance with the invention, only 25 volts is needed to fully close the shutter blades. The voltages needed to slightly angle the shutter blades are applied gradually in one or more embodiments so that the shutter blades do not close entirely due to the overshoot from the steady state position desired.

Figure 6:
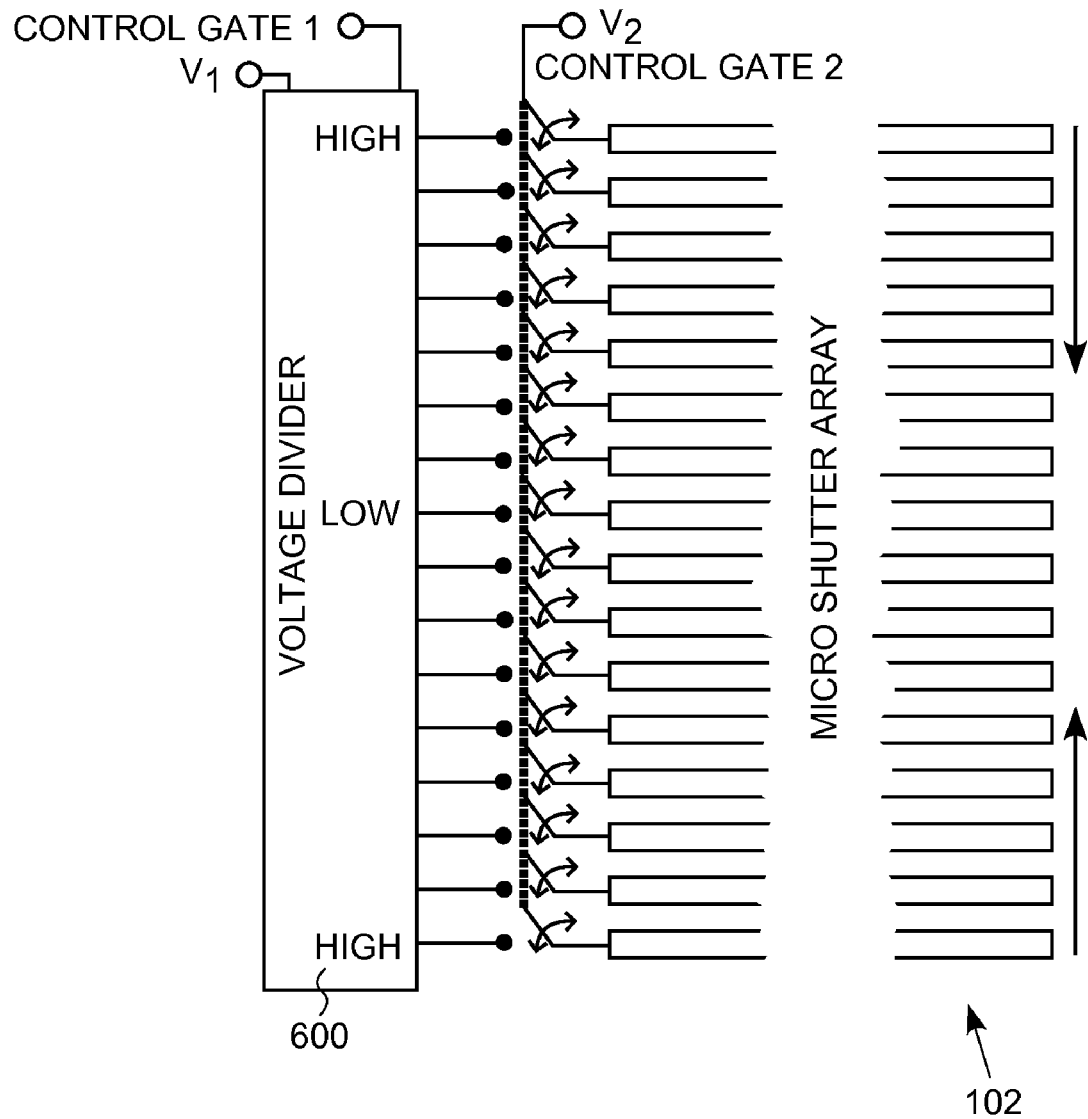
FIG. 6 is a block diagram of an exemplary control circuit for positioning microshutter elements 110 in an embodiment in accordance with the invention.

Referring now to FIG. 6, there is shown a block diagram of an exemplary control circuit for positioning the shutter control elements in an embodiment in accordance with the invention. Microshutter array 102 is formed on a semiconductor substrate (not shown) and therefore, electronic circuitry can be added to the device substrate if desired. This electronic circuitry can also be external to microshutter array. Gate 1 switches micro shutter array 102 to the normally open state. Voltage divider circuit 600 provides various voltages in order to position the blades at various angles. Voltage V1 is in general lower than V2, which is used to fully close the shutter blades. Voltage divider 600 may be nonlinear in order to supply various voltages to the blades. Voltage divider 600 can be designed from any number of electrical elements, such as resistors or transistors.

For the embodiment shown in FIG. 4, the blades 200 in microshutter elements 110 are positioned by applying a larger voltage to the outer blades and little or no voltage to the center blades in the array in an embodiment in accordance with the invention. The gang switch controlled by Gate 2 allows a larger voltage, V2, to be rapidly applied in order to fully close all the blades at once. Gate 2 can be applied rapidly since fully closing of the shutter blade array takes advantage of the mechanical overshoot in the lightly damped system.

The invention has been described in detail with particular reference to certain embodiments thereof, but it will be understood that variations and modifications can be effected within the scope of the invention as described above, and as noted in the appended claims, by a person of ordinary skill in the art without departing from the scope of the invention. For example, other types of circuits can be used to generate and apply the different voltages used to position the blades. Any circuit or device that generates or applies varying voltages to the blades can be used to position the blades.

Additionally, even though specific embodiments of the invention have been described herein, it should be noted that the application is not limited to these embodiments. In particular, any features described with respect to one embodiment may also be used in other embodiments, where compatible. And the features of the different embodiments may be exchanged, where compatible.

PARTS LIST

100 imaging apparatus
102 microshutter array
104 image sensor
106 lens
108 microlens array
110 microshutter element
112 controller
114 image processing component
200 blade
202 light transmissive portion
204 frame
206 torsion arm
208 journal bearing
400 camera lens
500 plot
502 plot
504 plot
600 voltage divider

What is claimed is:

1. A microshutter array comprising a frame having a single opening that includes a light transmissive portion;
   a plurality of linear microshutter elements extending across the light transmissive portion and in parallel to each other, each microshutter element comprises a flat blade extended in a length direction across the light transmissive portion and first and second torsion arms connected to the frame and extending outwards from each side of the blade in the length direction;
   a control circuit for producing a separately-controlled and independent voltage that is applied to each of the linear micro shutter elements; and
   a controller for setting the respective voltages applied to each of the linear microshutter elements.

2. The microshutter array of claim 1, wherein the light transmissive portion is a transparent material.

3. The microshutter array of claim 1, wherein the light transmissive portion is hollow.

4. The microshutter array of claim 1, further comprising lenslets to direct light between the microshutter elements.

5. The microshutter array of claim 1, wherein the flat blade allows light transmission through the light transmissive portion in an unactuated position and blocks light transmission when actuated.

6. The microshutter array of claim 1, wherein the control circuit comprises:
   a first gate for switching the microshutter array to a first state;
   a voltage divider circuit for providing multiple voltages in order to position the blades of the microshutter elements at various angles; and
   a second gate for switching the microshutter array to a second state.

7. A system comprising:
   a microshutter array comprising a frame having a single opening that includes a light transmissive portion;
      a plurality of linear microshutter elements extending across the light transmissive portion and in parallel to each other, each microshutter element comprises a flat blade extended in a length direction across the light transmissive portion and first and second torsion arms connected to the frame and extending outwards from each side of the blade in the length direction;
      a control circuit for producing a separately-controlled and independent voltage that is applied to each of the linear microshutter elements;
      a controller for setting the respective voltages applied to each of the linear microshutter elements; and
   a storage element for storing different settings for the linear microshutter elements.

8. The system of claim 7, wherein the light transmissive portion is a transparent material.

9. The system of claim 7, wherein the light transmissive portion is hollow.

10. The system of claim 7, further comprising lenslets to direct light between the microshutter elements.

11. The system of claim 7, wherein the flat blade allows light transmission through the light transmissive portion in an unactuated position and blocks light transmission when actuated.

12. The system of claim 7, wherein the control circuit comprises:
   a first gate for switching the microshutter array to a first state;
   a voltage divider circuit for providing multiple voltages to position the blades of the microshutter elements at various angles; and
   a second gate for switching the microshutter array to a second state.

13. An imaging apparatus, comprising:
   an imaging sensor comprising an array of pixels arranged in rows; and
   a microshutter array positioned over the array of pixels, wherein the microshutter array comprises:
      a frame having a single opening that includes a light transmissive portion;
      a plurality of linear microshutter elements extending across the light transmissive portion and in parallel to each other, each microshutter element comprises a flat blade extended in a length direction across the light transmissive portion and first and second torsion arms connected to the frame and extending outwards from each side of the blade in the length direction;
      a control circuit for producing a separately-controlled and independent voltage that is applied to each of the linear microshutter elements; and
      a controller for setting the respective voltages applied to each of the linear microshutter elements.

14. The imaging apparatus of claim 13, wherein the flat blade allows light transmission through the light transmissive portion in an unactuated position and blocks light transmission when actuated.

15. The imaging apparatus of claim 13, further comprising lenslets to direct light between the microshutter elements.

16. The imaging apparatus of claim 13, further comprising a lens to direct light to the microshutter array.

17. The imaging apparatus of claim 13, wherein the control circuit comprises:
   a first gate for switching the microshutter array to a first state;
   a voltage divider circuit for providing multiple voltages in order to position the blades of the microshutter elements at various angles; and
   a second gate for switching the microshutter array to a second state.

* * * * *